Sept. 7, 1943.　　　J. S. PARSONS　　　2,329,132
ELECTRICAL DISTRIBUTION SYSTEM
Filed June 28, 1940　　　7 Sheets-Sheet 1

Fig. 1.

WITNESSES:
Edward Michaels
C. L. Freedman

INVENTOR
John S. Parsons.
BY
ATTORNEY

Sept. 7, 1943.  J. S. PARSONS  2,329,132
ELECTRICAL DISTRIBUTION SYSTEM
Filed June 28, 1940  7 Sheets-Sheet 2

Fig. 2.

WITNESSES:

INVENTOR
John S. Parsons.
BY
ATTORNEY

Sept. 7, 1943.　　　J. S. PARSONS　　　2,329,132
ELECTRICAL DISTRIBUTION SYSTEM
Filed June 28, 1940　　　7 Sheets-Sheet 4

WITNESSES:
Edward Michaels
C. L. Freedman

INVENTOR
John S. Parsons.
BY
ATTORNEY

Sept. 7, 1943.   J. S. PARSONS   2,329,132
ELECTRICAL DISTRIBUTION SYSTEM
Filed June 28, 1940   7 Sheets-Sheet 6

WITNESSES:
Edward Michaels
C. L. Freedman

INVENTOR
John S. Parsons.
BY
ATTORNEY

Sept. 7, 1943.     J. S. PARSONS     2,329,132
ELECTRICAL DISTRIBUTION SYSTEM
Filed June 28, 1940     7 Sheets-Sheet 7

WITNESSES:
Edward Michaels
C. L. Freedman

INVENTOR
John S. Parsons.
BY
ATTORNEY

Patented Sept. 7, 1943

2,329,132

UNITED STATES PATENT OFFICE 2,329,132

ELECTRICAL DISTRIBUTION SYSTEM

John S. Parsons, Swissvale, Pa., assignor to Westinghouse Electric & Manufacturing Company, East Pittsburgh, Pa., a corporation of Pennsylvania Application June 28, 1940, Serial No. 342,940

8 Claims. (Cl. 175—294)

This invention relates to electrical distribution systems and it has particular relation to network distribution systems of the type wherein a plurality of primary feeder circuits are employed for supplying energy to a common secondary network or grid circuit.

One of the major problems confronting the electrical industry is that of distributing, satisfactorily, alternating current to consumers in urban and medium density areas. Such distribution must not only provide reliable and continuous service, but the cost of the distribution system must justify its installation.

For more than ten years the most reliable alternating current distribution system for heavy density or urban areas has been that known as the Palmer system. In this system a plurality of high voltage primary feeder circuits are employed for supplying energy to a common low-voltage secondary network or grid circuit. Each of the feeder circuits is connected to the common network circuit through a plurality of network transformers and network protectors. Each of the protectors includes a directional relay for controlling the operation of the network protector. When a fault occurs on the network circuit, the flow of current to the fault does not actuate the directional relays and the fault is burned clear. The amount of energy available from the feeders is so large that generally no difficulty is encountered in burning clear faults occurring on the network circuit.

When a fault occurs on a feeder circuit, the flow of current through the directional relays associated with the feeder circuit actuates the relays and tips the network protectors to disconnect the faulted feeder circuit from the network circuit. The sound feeder circuits continue to supply energy to the network circuit and substantially no impairment of service results from a fault occurring on any feeder circuit.

Although the Palmer type network distribution system provides service of excellent reliability and continuity, its cost has justified its adoption only in areas having a heavy density of energy consumption such as the areas occurring in large cities.

At present a large proportion of electrical energy is supplied to medium density areas through radial systems. Such systems are relatively low in cost but are unsatisfactory because of the unreliability of the service which they offer. For example, a failure of a single feeder in a radial system results in an inconvenient outage for the entire distribution circuit supplied by the feeder.

An alternative service is provided in a system described in Patents 1,979,353, 1,979,703 and 2,023,096, which are assigned to the Westinghouse Electric & Manufacturing Company. In this system the network protectors of the conventional Palmer system are replaced by low cost sectionalizing switches which open only when the system is deenergized. To this end, when a fault occurs on a feeder circuit the feeder circuit breakers open to deenergize completely the entire system. After the feeder circuit breakers open, the sectionalizing switches associated with the faulted feeder also open. When the feeder circuit breakers reclose, only those sectionalizing switches associated with the sound feeders are closed.

Such a system may be installed at a relatively low cost. However, although the outages from such a system are of shorter duration than those encountered in a radial system of distribution, they affect a larger number of customers and occur more frequently for the reason that a fault on any feeder results in a short outage for the entire system. A second disadvantage of this system is that the feeders cannot be relied upon to supply radial loads or conventional network circuits connected in parallel with the simplified network shown in the aforesaid patents. These factors substantially restrict the field of application for this system.

In accordance with this invention, the conventional common network circuit or grid is replaced by a plurality of substantially independent secondary loop circuits. A plurality of primary feeder circuits are employed for supplying electrical energy through a plurality of network transformers to each of the loop circuits and the connections between the feeder circuits, and each of the loop circuits are so disposed that when any feeder circuit is removed from service the load on the loop circuit is distributed uniformly among the transformers associated with the remaining feeder circuits. By providing independent loop circuits, it is possible to isolate any loop without removing other loop circuits from service. Moreover, in starting operation on a dead or deenergized distribution system, it is possible to add loop circuits to the system successively as the condition of the system permits.

A further aspect of this invention comprises the replacement of the Palmer type network protector by inexpensive, rugged switches. Each of the network transformers is connected to its associated loop through a network switch which is designed to open only when substantially no current flows therethrough. Between each pair of network transformers a sectionalizing switch is placed in the loop circuit. The sectionalizing switches open in advance of the network switch when a fault occurs on a feeder circuit associated therewith. Since the feeder circuit also opens, the network switch is completely deenergized before it opens. Since the network switch does not open a circuit carrying current, its design may be appreciably simplified, and the network switch may, if desired, be placed in the casing of its network transformer. Moreover, due to the usual location of the sectionalizing switches midway between the two adjacent transformers, the fact that load is tapped off along the secondary loop circuit, and the fact that the transformer currents flow two ways from the transformers in the secondary loop circuit, each sectionalizing switch requires a current capacity of only 50 to 75% of the current rating of the largest adjacent network transformer.

If a switching system designed in accordance with this invention were applied to a conventional network circuit, one network switch and about one and one-half sectionalizing switches would be required for each network transformer. However, with the loop system, only one network switch and one sectionalizing switch are required for each network transformer. As above indicated, the design and relaying of these switches may be appreciably simpler than that provided in the conventional network protector.

It is, therefore, an object of this invention to provide a network switch of simple and rugged design.

It is a further object of this invention to provide a network switch which opens only when substantially no current flows therethrough.

It is a further object of this invention to provide a manually reset network switch which opens under fault conditions only when substantially no current flows therethrough, but which does not open when the entire network system is deenergized.

It is a further object of this invention to provide a network switch which closes only if the phase conditions across its contacts are correct.

It is a further object of my invention to provide an improved phasing control for distribution switches.

It is a still further object of this invention to provide a network switch which opens only when substantially no current flows therethrough and which closes after a predetermined time delay.

It is a still further object of the invention to provide a network switch and a network transformer with a single casing.

Other objects of the invention will be apparent from the following description taken in conjunction with the accompanying drawings, in which.

Figure 1:
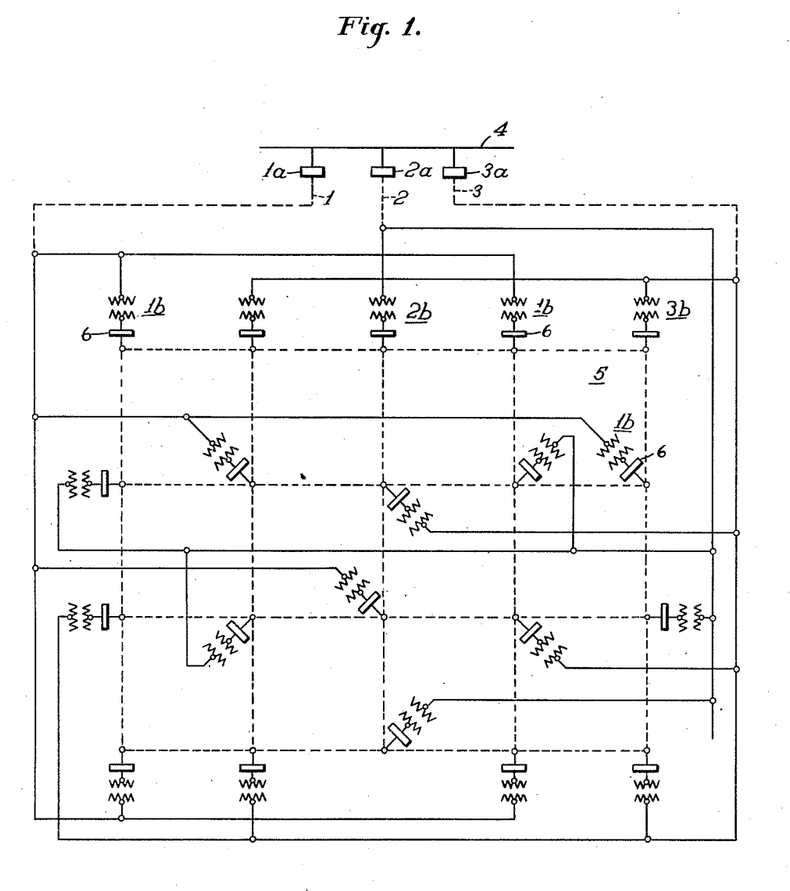
Figure 1 is a single-line diagrammatic view of a network distribution system.

Referring to the drawings, Fig. 1 represents a conventional Palmer type network distribution system. In this particular system, three feeders 1, 2 and 3 are shown for supplying electrical energy from one or more sources, here represented by a bus 4, to a common network circuit or grid 5. Each of the feeder circuits is provided with a feeder circuit breaker 1a, 2a and 3a for controlling the connection to and disconnection from the bus 4 of the feeder circuits. The feeder circuits also are connected through network transformers 1b, 2b and 3b, which may be of the high reactance type, and through network protectors 6 to the network circuit 5. In order to keep down the spare transformer capacity required, it is the practice to interlace the feeder circuits as thoroughly as possible as illustrated in Fig. 1. It should be noted further that the entire network circuit 5 is rigidly connected together.

When a fault occurs on the network circuit 5, the fault is burned clear with no operation of the network protectors 6. Under these conditions, the high reactances of the network transformers prevent excessive feeder circuit currents from flowing.

If a fault occurs on one of the feeder circuits such as the feeder circuit 1, the directional relays of the network protectors 6 associated with all of the network transformers 1b operate to disconnect the feeder 1 from the network circuit 5. In addition, the feeder circuit breaker 1a opens to disconnect completely the feeder circuit 1 from both the bus 4 and the network circuit 5. Energy for the network circuit then is supplied over the remaining feeder circuits 2 and 3. A more complete description of the network protectors and the operation of the system illustrated in Fig. 1 may be found by reference to my Patents 1,973,097, 1,997,597 and 2,013,836, which illustrate typical network relays and their operation.

As above explained, a system similar to that illustrated in Fig. 1 is excellent from the standpoint of reliability and service continuity. Its principal drawback is that of cost.

Figure 2:
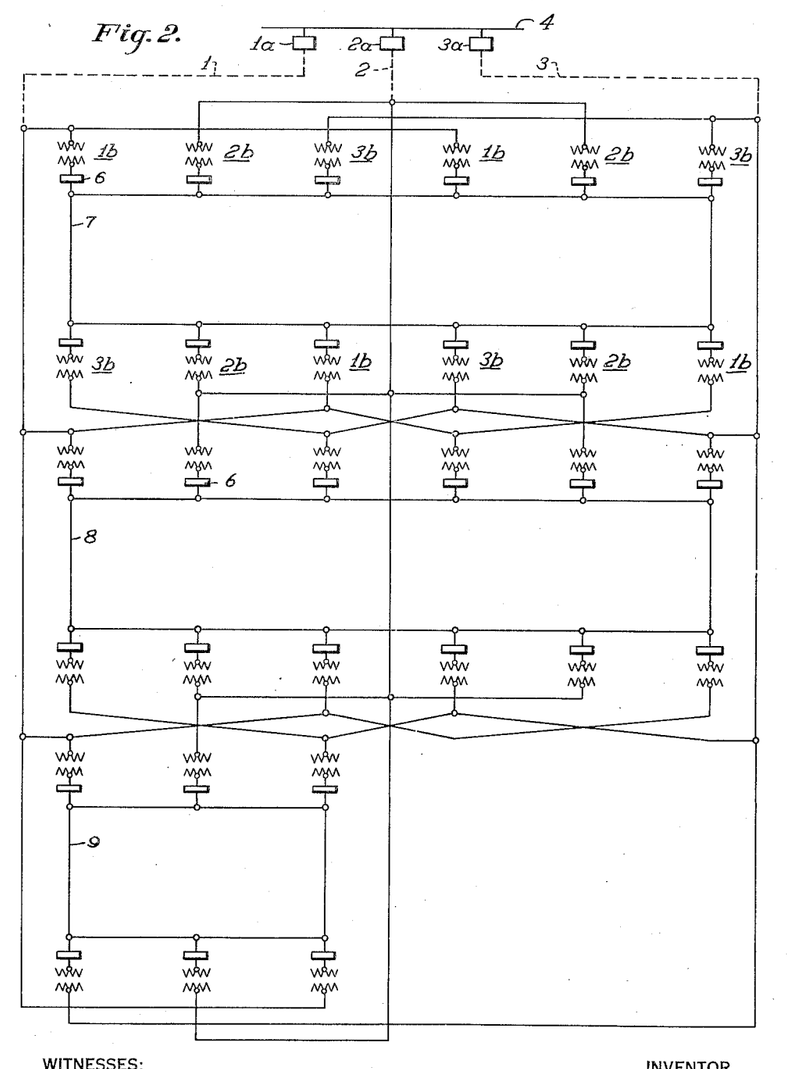
Fig. 2 is a single-line diagrammatic view of a modified network distribution system.

In Fig. 2, a network distribution system is illustrated which departs somewhat from the conventional Palmer system. In Fig. 2 the feeder circuits 1, 2 and 3 are connected through their associated network transformers 1b, 2b and 3b to a plurality of substantially independent low-voltage loop circuits 7, 8 and 9. These loop circuits may be of the same dimensions or of different dimensions as illustrated by the short loop circuit 9 of Fig. 2. The various network transformers may be connected to the loops through network protectors 6 which may be of the conventional Palmer type illustrated in my aforesaid patents. It will be understood that consumers of electrical energy are supplied with service from the various loop circuits.

To assure a uniform distribution of load among the various network transformers under different conditions, the network transformers are preferably connected to each loop circuit in an orderly sequence as illustrated in Fig. 2. Moreover, in each loop circuit the impedance of the loop circuit between any pair of adjacent network transformers is substantially equal to that of the loop circuit between any other pair of adjacent network transformers. This result may be obtained by proper spacing of the network transformers or by including reactors, if necessary, adjacent certain of the network transformers.

With the system illustrated in Fig. 2, if any of the feeder circuits such as the feeder circuit 1a is removed from service, the loads on the loop circuits will be divided evenly among the network transformers associated with the remaining feeder circuits.

Although the conventional network protectors such as those illustrated in my aforesaid patents provide ideal operation of the loop system illustrated in Fig. 2, such protectors are designed to open circuits carrying substantial current and their design is somewhat complicated and expensive. In order to simplify and reduce the cost of the network system, I have developed a complete new switching sequence which is illustrated diagrammatically in Fig. 3.

Figure 3:
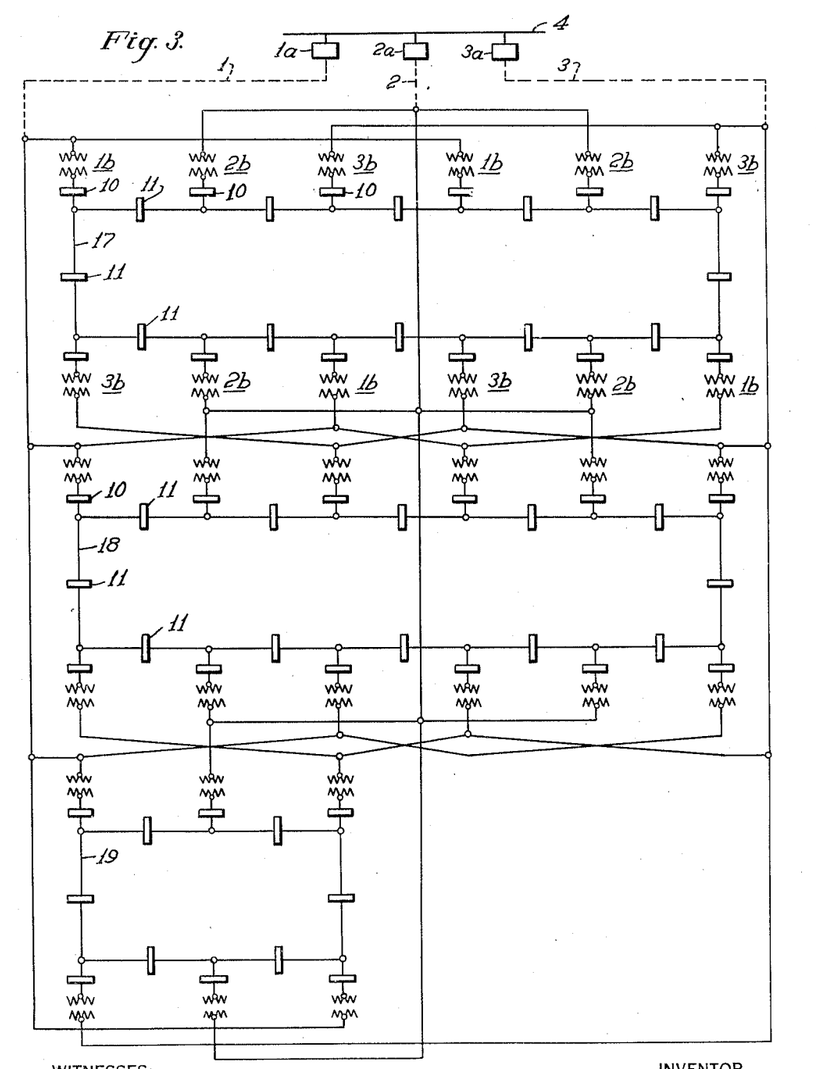
Fig. 3 is a single-line diagrammatic view of a modified network distribution system embodying this invention.

Referring to Fig. 3, a plurality of loop circuits 17, 18 and 19, which correspond to the loop circuits 7, 8 and 9 of Fig. 2 are energized from the three feeder circuits 1, 2 and 3 through the network transformers 1b, 2b and 3b. However, in place of the network protector 6 of Fig. 2, I provide a transformer or network switch 10 which is designed to open a circuit carrying substantially no current.

Before actuation of the network switch 10 to its open condition, the network switch 10 is first isolated from any source of current. For this purpose each network switch 10 is separated from adjacent network switches by means of sectionalizing switches 11. When a fault occurs on any feeder circuit such as the feeder circuit 1, the sectionalizing switches 11 adjacent each of the network transformers 1b open in response to the excess flow of current from the loop circuits to the faulted feeder circuit. In addition, the feeder circuit breaker 1a also opens and completely deenergizes the network transformers 1b and the network switches 10 associated therewith. The network switches 10 are responsive to the deenergized condition of the associated network transformers 1b and open with substantly no current flowing therethrough.

Preferably, the sectionalizing switches 11 close automatically after a time delay to restore the loop circuits to their original condition for energization from the sound feeder circuits 2 and 3. Under this condition of energization the load on the loop circuits is divided evenly among the network transformers 2b and 3b.

If a fault occurs on a loop circuit, it is desirable that the fault burn clear without necessitating the tripping of any network switch or sectionalizing switch. Since most faults occurring on a network circuit or loop circuit clear in approximately one or two seconds, by providing the sectionalizing switches 11 with a suitable time delay, faults occurring on the loop circuits are permitted to burn clear.

In Figs. 2 and 3, certain circuits are illustrated by diagonal lines. This illustration is for the purpose of facilitating the tracing of circuits and has no other significance.

The loop circuits illustrated in Figs. 2 and 3 may be either single-phase or polyphase. If single-phase they may be energized from a single-phase source or from a polyphase source. For example, if single-phase loop circuits are connected for energization from a three-phase source, one-third of the loop circuits would be connected for energization from each phase of the three-phase source. In such a system, by employing single-phase feeder circuit breakers, a failure of any phase will not impair service on the remaining operative phases.

If the switching system illustrated in Fig. 3 were employed on a conventional network or grid circuit, it would follow that substantially one network switch 10 and one and one-half sectionalizing switches 11 would be required for each network transformer. By adoption of the loop circuits illustrated in Figs. 2 and 3, this requirement is cut to one network switch 10 and one sectionalizing switch 11 for each network transformer.

As above indicated, a sectionalizing switch is located between two network transformers. Because of its location, the capacity of the sectionalizing switch need be only 50 to 75% of the capacity of the largest of the two adjacent network transformers. The sectionalizing switch is designed to trip for a flow of power in either direction therethrough. Moreover, the sectionalizing switch is designed to reclose when a suitable voltage is present on either side of the switch. A suitable construction is illustrated in Fig. 4.

Figure 4:
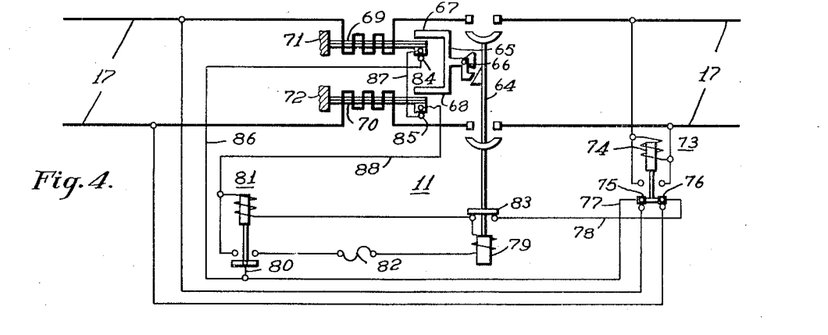
Fig. 4 is a diagrammatic view of a sectionalizing switch suitable for the system illustrated in Fig. 3.

Referring to Fig. 4, the sectionalizing switch 11 includes a circuit breaker 64 for connecting two portions of the loop circuit 17. The circuit breaker 64 is maintained in a closed position by means of a latch 65 which is pivoted for rotation about a point 66. The latch 65 is provided with two tripping legs 67 and 68 which are positioned in the paths of travel of two thermal elements 69 and 70. These thermal elements are designed to be heated by current flowing in the conductors of the loop circuit 17. Although heat for the thermal elements may be provided in various manners, in the illustration, current passing through the conductors of the loop circuit 17 passes directly through the heaters of the thermal elements. As the thermal elements heat, they tend to rotate about fixed supports 71 and 72 into engagement with the tripping legs 67 and 68. The thermal elements may take various forms, but as illustrated, they are bimetallic elements.

Excessive current may flow through the heaters for the thermal elements either for an internal loop circuit fault or for an external feeder circuit fault. Ordinarily it is desirable that internal or loop circuit faults burn themselves clear. Most of these internal faults will burn clear in one or two seconds. Consequently, the thermal elements 69 and 70 are provided with a time delay, preferably an inverse time delay, with a minimum operating time of two to two and one-half seconds when maximum current flows to a fault occurring in the secondary or loop circuit 17. This provides adequate time for clearance of the usual secondary or loop circuit fault. The thermal elements 69 and 70 may be adjusted to trip the circuit breaker 64 in response to current in excess of 60 to 100% of the full load current of the larger of the two network transformers adjacent the sectionalizing switch 11.

For automatically closing the sectionalizing switch 11, it is desirable that the circuit breaker 64 close when sufficient voltage is present on either side of the circuit breaker. To this end a transfer relay 73 is provided for energizing the closing circuit of the circuit breaker 64 from either side of the circuit breaker. In the form illustrated, the transfer relay includes a solenoid 74 which is connected for energization in accordance with the voltage present on one side of the circuit breaker 64. This transfer relay is adjusted to pick up and close its front contacts when energized by a voltage greater than 70 to 75% of normal. It is designed to drop and engage its back contacts when the energizing voltage drops below 25 to 50% of normal. The front contacts are connected to the loop circuit 17 on one side of the circuit breaker 64 and the back contacts are connected to the loop circuit 17 on the opposite side of the circuit breaker 64. In the form illustrated, the transfer relay 73 is provided with a movable contact member having two insulated contacts 75 and 76 for selectively engaging the front or back contacts of the relay. The movable contacts 75 and 76 are connected through suitable conductors 77 and 78 to energize the closing mechanism of the circuit breaker 64. It will be observed that if the voltage applied to the solenoid 74 is in excess of 70 to 75% of normal, the conductors 77 and 78 are connected, respectively, to the conductors of the loop circuit 17 on the right of the circuit breaker 64. If the voltage applied to the solenoid 74 drops below 25 to 50% of normal, the conductors 77 and 78 are connected, respectively, to the conductors of the loop circuit on the left of the circuit breaker 64. Consequently, the closing circuit for the circuit breaker will be energized even though either portion of the loop circuit is deenergized.

Reclosure of the circuit breaker 64 is effected through a closing motor or solenoid 79. The closing circuit for the solenoid 79 may be traced from the movable contact 75 through the conductor 77, a conductor 80, contacts of a closing relay 81, a fuse 82, the solenoid 79, a pallet switch 83 carried by the circuit breaker 64, and the conductor 78 which is connected to the second movable contact 76.

In order to provide adequate time for operation of the network switches 10, it is desirable that the circuit breaker 64 be closed only after the expiration of a suitable time delay such as four to six seconds. In the embodiment illustrated in Fig. 4, this time delay is provided by the thermal elements 69 and 70 which have back contacts 84 and 85. After an actuation of either of the thermal elements 69 and 70 into tripping condition, a delay of four to six seconds is required before the thermal elements reengage their back contacts 84 and 85. These back contacts are included in the closing circuit for the circuit breaker 64.

The energizing circuit for the closing relay 81 may be traced from the movable contact 75 through the conductor 77, a conductor 86, the back contact 84, a conductor 87, the back contact 85, a conductor 88, the solenoid of the closing relay 81, the pallet switch 83 and the conductor 78 back to the second movable contact 76. This closing relay 81 is adjusted to close its front contacts, and seal itself closed, in response to a voltage above approximately 80% to 85% of normal.

When the closing relay 81 operates to close its front contacts, it establishes a closing circuit for the closing solenoid 79, as above described.

If a fault occurring on the secondary or loop circuit 17 should persist for more than two or two and one-half seconds, the circuit breaker 64 closes and trips at intervals of approximately six to eight seconds. If it is desired to eliminate excessive operation or "pumping" of the circuit breaker 64 under these circumstances, a fuse 82 may be included in the closing circuit of the circuit breaker. This fuse may be so proportioned that it blows and opens the closing circuit after six to twelve immediately consecutive operations of the circuit breaker 64 in response to the cumulative intermittent energization thereof. This should provide ample opportunity for any usual secondary or loop circuit fault to burn itself clear.

Figure 5:
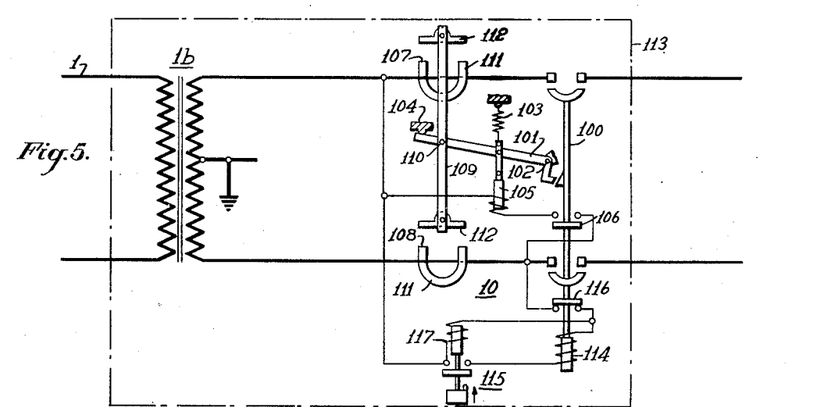
Fig. 5 is a diagrammatic view of a network switch embodying this invention which is suitable for the system illustrated in Fig. 3.

The network switch 10 is designed to open only when substantially no current flows therethrough. A suitable construction for this purpose is illustrated in Fig. 5, wherein a circuit breaker 100 is employed for controlling the connection of the network transformer 1b to a loop circuit. The circuit breaker 100 is latched in its closed position by means of a suitable tripping lever 101 which is pivoted for rotation about a fixed axis 102. A spring 103 is employed for biasing the tripping lever 101 towards its tripping position against a stationary stop 104.

Under normal conditions of operation, the tripping lever 101 is maintained in its latching position by means of a voltage responsive solenoid 105, which is connected across the secondary of the network transformer 1b through the front contacts of a pallet switch 106 carried by the circuit breaker. The solenoid 105 is so designed that when the voltage thereacross falls below approximately 25 to 30% of its normal value, the spring 103 rotates the tripping lever 101 into its tripping position.

Referring to Fig. 3, when the sectionalizing switch 11 adjacent a network switch 10 associated with a transformer 1b open, and when the feeder circuit breaker 1a opens in response to a fault occurring on the feeder circuit 1, the network switch 10 is completely deenergized. Under these conditions, the voltage across the solenoid 105 of Fig. 5 drops below 25 to 30% of its normal value, and the circuit breaker 100 trips to disconnect the transformer 1b from its loop circuit. It should be noted that under these conditions substantially no current flows through the circuit breaker 100.

If the tripping of the circuit breaker 100 is controlled only by an undervoltage control device, the circuit breaker may open when carrying substantial current under some fault conditions. For example, when a fault occurs on a loop circuit adjacent the circuit breaker 100, the voltage across the solenoid 105 may fall well below 25 to 30% of its normal value. Consequently, the circuit breaker 100 will trip while carrying the full fault current. If the circuit breaker is designed for such operation, no harm results. However, as above explained, it is desirable that the circuit breaker 100 open only while carrying substantially no current. It is also desirable that circuit breaker 100 remain closed so that transformer 1b may supply current to the fault to assist in burning it clear. To this end, a current-responsive device is provided in Fig. 5 for assisting the solenoid 105.

The current-responsive device may take the form of two electromagnets 107 and 108 which control a link 109 pivotally attached to the tripping lever 101 by means of a pin 110. Each of the electromagnets may comprise a U-shaped magnetic member 111 which may be of laminated soft iron or steel. Each of the U-shaped magnetic members is positioned with its legs substantially surrounding one of the main conductors associated with the secondary of the network transformer 1b. Each magnetic member 111 is provided with a magnetic armature 112 attached to the link 109.

The electromagnets 107 and 108 may be so designed that with current in excess of three to five times normal rated load current flowing through the circuit breaker 100 and with zero voltage across the solenoid 105, the tripping lever 101 is maintained in its latching position against the bias of the spring 103. The electromagnets 111 and solenoid 105 cooperate to prevent opening of the circuit breaker 100 when substantial current flows therethrough. This greatly facilitates the placement of the network switch 10 and the network transformer 1b in a common casing, represented in Fig. 5 by a broken line 113. The circuit breaker 100 may be immersed in the insulating and cooling liquid employed for the transformer 1b.

For maximum economy, the network switch 10 may be provided only with a manual reclosing structure. For completeness, however, I have illustrated in Fig. 5 a simple reclosing mechanism therefor. Generally, a reclosing mechanism is preferable. In Fig. 5, the circuit breaker 100 is provided with a closing motor or solenoid 114 which may be connected across the secondary of the transformer 1b through the front contacts of a timing relay 115 and the back contacts of a pallet switch 116 carried by the circuit breaker. When the circuit breaker trips, the back contacts of the pallet switch 116 close to connect the operating coil 117 of the timing relay 115 across the secondary of the network transformer 1b. At the end of a predetermined time delay, such as three to six seconds, the front contacts of the timing relay close to connect the closing solenoid 114 across the secondary of the transformer. The parts may be so proportioned that the circuit breaker closes with a three to six second time delay when voltage in excess of approximately 90% of the normal voltage appears across the secondary of the transformer. The time delay is provided for proper cooperation with a reclosing feeder circuit breaker, and this cooperation will be set forth more particularly in connection with Fig. 8.

As above indicated, the network switch 10 may be made manually reclosing for maximum economy. When a tripping mechanism, similar to that illustrated in Fig. 5, is employed, satisfactory operation of the network switch 10 is assured, but under some conditions certain inconvenience may result from operation thereof if manual reclosing is used. Referring to Fig. 3, let it be assumed that all sources of energy connected to the bus 4 are intentionally disconnected. Under these conditions, the entire network distribution system is deenergized, and all of the network switches 10 trip to disconnect the deenergized feeders from the associated loop circuits. If these network switches 10 are of the manual reclosing type, each switch must be manually reclosed when the network distribution system is again placed in operation. The manual reclosing of each network switch 10 results in substantial inconvenience and unnecessary delay in the restoration of service.

Figure 6:
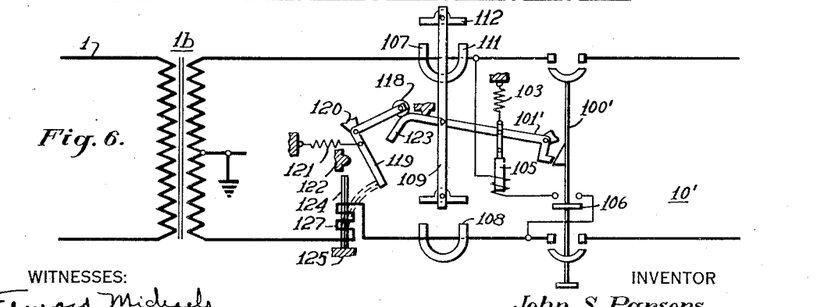
Figs. 6, 7, 8 and 9 are diagrammatic views showing modifications of the network switch illustrated in Fig. 5.
Figure 7:
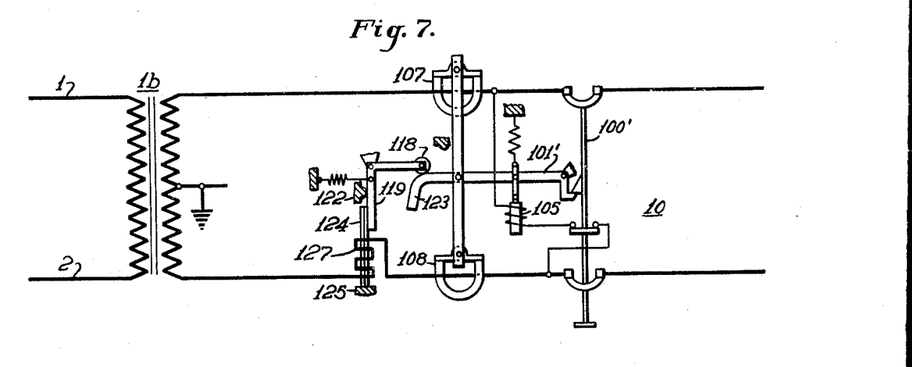

In Figs. 6 and 7, a manual reclosing network switch 10' is illustrated which does not trip when the entire network distribution system is deenergized due to failure of the power supply to bus 4, Fig. 3. This network switch includes a circuit breaker 100', which is similar to the circuit breaker 100 of Fig. 5 except for the omission of the reclosing mechanism. The tripping of the circuit breaker 100' is controlled by a tripping lever 101' which corresponds to the tripping lever 101 of Fig. 5, and which is controlled by the electromagnets 107 and 108 and by the solenoid 105 described with reference to Fig. 5.

Tripping of the circuit breaker 100' when the entire distribution system is deenergized is prevented by a roller 118 which is carried by a bell crank 119 pivoted for rotation about a stationary axis 120. A spring 121 is provided for biasing the bell crank 119 in a clockwise direction about its axis towards a fixed stop 122. When the circuit breaker 100' is manually closed, the roller 118 travels along a curved guide extension 123 carried by the tripping lever 101' from the position illustrated in Fig. 6 into the position illustrated in Fig. 7, wherein the bell crank 119 is against the stop 122. With the parts in the positions illustrated in Fig. 7, the roller 118 prevents movement of the tripping lever 101' to tripping position, even though the electromagnets 107 and 108 and the solenoid 105 are completely deenergized. Consequently, the tripping lever 101' retains the circuit breaker 100' in its closed condition, even though the distribution system is completely deenergized.

In order to permit tripping of the circuit breaker 100' when a fault occurs on the feeder circuit 1, a current-responsive device is employed for actuating the bell crank 119 away from its stop 122. This current-responsive device may take the form of a thermal element, such as a bimetallic thermal element 124 carried by a stationary support 125. When this thermal element is heated, it is designed to move from the full-line position illustrated in Fig. 6 to the position illustrated in dotted lines. In so moving, the thermal element rotates the bell crank 119 in a counterclockwise direction to carry the roller 118 away from the tripping lever 101'. Following such movement of the roller 118, the tripping lever 101' is controlled only by the electromagnets 107 and 108 and the solenoid 105 in the manner described with reference to Fig. 5. The thermal element 124 may be heated in any desired manner. As illustrated, a heating coil 127 is connected directly into one of the conductors associated with the secondary of the transformer 1b.

The thermal element 124 may be so designed that it carries one and one-half to two times the full load current of the network switch without actuating the bell crank 119. The design is such that, with three to four times the full rated load current of the network switch flowing therethrough, the thermal element actuates the bell crank 119 to release the tripping lever 101' in approximately one and one-half to two seconds.

Under normal load conditions and when the entire system is deenergized, the roller 118 remains in the position illustrated in Fig. 7 to prevent tripping of the circuit breaker 100'. When a fault occurs on the feeder circuit drawing three to four times rated load current of the network switch, the thermal element 124 operates in one and one-half to two seconds to release the tripping lever 101'. Such release of the tripping lever does not necessarily result in tripping of the circuit breaker 100'. Such tripping takes place only if the voltage across the solenoid 105 and the current through the electromagnets 107 and 108 are below predetermined values. With such a construction, the circuit breaker 100' trips only when carrying substantially no current, and does not trip when the entire distribution system is deenergized. It should be noted that after an operation, the thermal element returns to its full line position with a time delay due to the inherent cooling properties thereof. In the system illustrated, the time delay is ample to permit satisfactory tripping.

Figure 8:
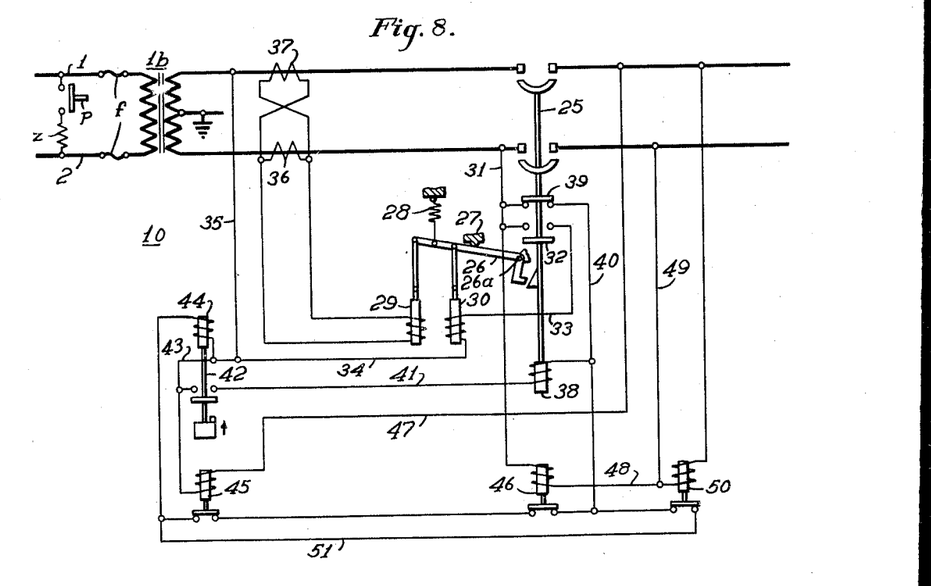

In Fig. 8 another suitable network switch 10 is illustrated. In this figure, a network transformer 1b having fuses f for its primary winding is illustrated for supplying a three-wire, single-phase loop circuit. The network transformer 1b is connected to a loop circuit through a network circuit breaker 25. Under normal operating conditions, this circuit breaker is held in its closed position by means of a latch 26 pivoted for rotation about a point 26a. This latch is biased away from its latching position against a stop 27 by means of a suitable biasing device such as a spring 28. The latch 26 is maintained in its latch position by means of two solenoids 29 and 30. One of these solenoids 30 is energized in accordance with the voltage across the secondary of the network transformer 1b through a circuit which may be traced from one terminal of the transformer secondary through a conductor 31, the front contacts of a pallet switch 32 carried by the circuit breaker 25, a conductor 33, the solenoid 30, a conductor 34, and a conductor 35 to a second terminal of the transformer secondary. The parts are so proportioned that with no current flowing in the secondary of the network transformer the latch 26 will trip when the voltage across the secondary of the network transformer falls below approximately 25 to 30% of its normal value.

When a fault occurs on a loop circuit adjacent a network transformer, the voltage across the secondary of the transformer may drop below 25 to 30% of its normal value. Under such conditions the solenoid 30 would fail to hold the latch 26 in its closed position and the circuit breaker 25 would trip while carrying substantial current. Since it is desirable that the circuit breaker 25 trip only when little or substantially no current flows therethrough, the second solenoid 29 is energized from current transformers 36 and 37 in accordance with current flowing in the secondary of the network transformer. The solenoid 29 is so designed that with currents above about three to five times normal rated load current flowing through the secondary of the network transformer 1b, and assuming zero voltage across the secondary of the network transformer, the solenoid 29 will hold the latch 26 in its closed position. With this arrangement the circuit breaker 25 trips substantially only when it is in a deenergized condition, or when relatively small currents flow therethrough, and it trips without appreciable time delay.

Automatic reclosure of the network switches may be provided. As illustrated in Fig. 8, the circuit breaker 25 is provided with a closing solenoid or motor 38. This closing solenoid is energized from the secondary of the network transformer through a circuit which may be traced from the conductor 31 through the back contacts of a pallet switch 39, a conductor 40, the closing solenoid 38, a conductor 41, front contacts of a timing relay 42, a conductor 43 and the conductor 35.

The purpose of the time delay relay is to prevent reclosure of the network switch 10 during those periods when the feeder circuit breaker associated with the feeder circuit 1 is closed on a reclosing cycle. On a typical reclosing cycle a feeder breaker may be reclosed first instantaneously, second, after a ten second delay, and third, after a fifteen second delay followed by a lockout of the circuit breaker if the fault on the feeder circuit does not clear during a portion of the reclosing cycle. With such a setting of the feeder circuit breaker, the timing relay 42 should completely reset in somewhat less than ten seconds, for example, in about eight seconds. To this end the timing relay 42 may interpose a time delay of three to six seconds in the closing of the network switch 25 and may reset for a subsequent operation in approximately eight seconds or less. With such a timing of the relay 42 the full delay of three to six seconds, to prevent reclosing while the feeder breaker is closed during its reclosing cycle, is available at the beginning of each reclosure of the feeder circuit breaker and the network switch 25 will not close unless the feeder circuit breaker closes and remains closed.

The timing relay 42 is energized in accordance with the voltage across the secondary of the network transformer 1b. It is adjusted to close in response to voltages above approximately 90% of the normal voltage. The timing relay 42 may be provided with a closing solenoid 44 connected directly across the secondary of the network transformer. Such a connection will not prevent the circuit breaker 25 from closing when the polarity across the terminals of the circuit breaker 25 is incorrect. In many applications a phasing control for the network switch 10 is not justified and in those applications the solenoid 44 may be connected as indicated directly across the secondary of the network transformer 1b.

For those installations in which a phasing control is desired, a pair of phasing relays 45 and 46 are connected across the terminals of the circuit breaker 25. The energizing circuit for the phasing relay 45 may be traced from the conductor 35 through the conductor 43, the phasing relay 45 and the conductor 47 to the opposite side or loop-circuit side of the circuit breaker 25. The connections for the phasing relay 46 may be traced from the conductor 31 through the phasing relay 46, a conductor 48 and a conductor 49 to the opposite or loop-circuit side of the circuit breaker 25. The back contacts of both of the phasing relays 45 and 46 are included in the closing circuit for the timing relay 42. This closing circuit may be traced from the conductor 35 through the solenoid 44 of the timing relay, the back contacts of the phasing relays 45 and 46, the conductor 40, the pallet switch 39 and the conductor 31. Consequently, if the polarity across either pair of terminals of the circuit breaker 25 is incorrect one of the phasing relays 45 will remain open and will prevent energization of the timing relay 42. Under these circumstances the circuit breaker 25 will not reclose. The phasing relays 45 and 46 are adjusted to open their back contacts when a slight voltage exists across the terminals of the circuit breaker 25.

For the conditions in which a circuit breaker 25 is to be closed on a dead network circuit or loop circuit a separate relay 50 is provided for by-passing the phasing relays 45 and 46. The relay 50 establishes an energizing circuit for the timing relay 42 which may be traced from the conductor 35 through the solenoid 44 of the timing relay, the conductor 51, the back contacts of the relay 50, the conductor 40, the back contacts of the pallet switch 39 and the conductor 31. When the network or loop circuit is deenergized, the relay 50 closes its back contacts, thereby establishing an energizing circuit for the timing relay 44 and the circuit breaker consequently closes, regardless of the condition of the phasing relays 45 and 46. The relay 50 is energized in accordance with the voltage present on the loop-circuit side of the circuit breaker 25, and is designed to drop and close its back contacts in the absence of voltage.

Figure 9:
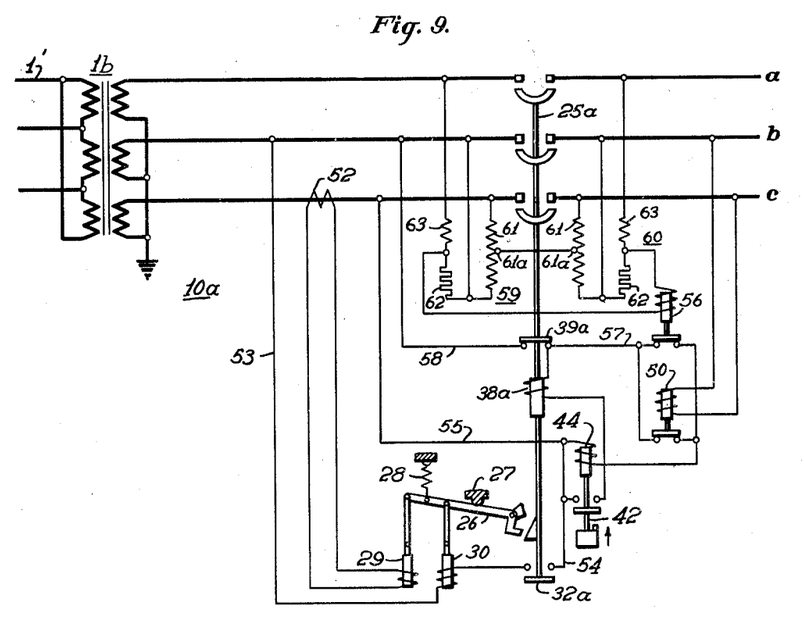

In Fig. 9, I have illustrated a modified network switch 10a which is designed for a three-phase distribution system. In Fig. 9, a three-phase feeder circuit 1' supplies a network circuit or loop circuit through a three-phase network transformer 1b. A circuit breaker 25a is employed for the three-phase system which corresponds to the circuit breaker 25 of Fig. 8 and is controlled by the same latching mechanism illustrated in Fig. 8. In Fig. 9, however, the current solenoid 29 is energized from a single current transformer 52, and the voltage solenoid 30 is energized from one phase of the secondary of the network transformer 1b. The energizing circuit for the voltage solenoid 30 may be traced from a conductor 53 through the voltage solenoid 30, front contacts of a pallet switch 32a carried by the circuit breaker, a conductor 54 and a conductor 55. The operation of the latching mechanism is similar to that described with reference to Fig. 8. In Fig. 9, the parts 25a, 32a, 38a and 39a correspond to the parts 25, 32, 38, and 39 of Fig. 8.

The circuit breaker 25a of Fig. 9 may be manually reclosed but preferably, as illustrated, an automatic reclosing system is employed. This reclosing system employs the timing relay 42 of Fig. 8 which is energized, in Fig. 9, through a circuit which may be traced from the conductor 55 through the solenoid 44 of the timing relay, the back contacts of a phasing relay 56, a conductor 57, the back contacts of the pallet switch 39a and a conductor 58. The timing relay 42 consequently is responsive to the voltage across one phase of the three-phase circuit and operates in the same manner discussed with reference to Fig. 8.

Although a phasing system need not be employed in Fig. 9, a phasing relay 56 is illustrated for completeness. This relay 56 is energized in accordance with the outputs of two positive phase-sequence voltage filters 59 and 60. The positive phase-sequence voltage filter 59 is connected on the transformer side of the circuit breaker 25a and is connected to provide an output proportional to the positive phase-sequence voltage of the feeder circuit. The positive phase-sequence voltage filter 60 is connected on the network or loop circuit side of the circuit breaker 25a and is connected to have an output proportional to the positive phase-sequence voltage of the network or loop circuit. The outputs of the voltage filters are connected so that the phasing relay 56 is energized by the difference of the output voltages of the two filters 59 and 60. If, during repairs of the feeder circuit 1', phase conductors are interchanged, the outputs of the two positive phase-sequence voltage filters are no longer substantially equal and in phase, and the phasing relay 56 opens its contacts to prevent closure of the circuit breaker 25a.

The construction of the positive phase-sequence voltage filters may be similar to that illustrated in the Lenehan Patent No. 1,936,797, which is assigned to the Westinghouse Electric & Manufacturing Company. Each of these voltage filters comprises, in general, an auto-transformer 61 having a 40% tap 61a, a resistor 62 and a reactor 63. The various elements of each filter are so related that the voltage drop across the resistor 62 is equal to the same percentage of the total voltage impressed on the resistor 62 and the reactor 63 in series as the ratio of the auto-transformer 61, but lags the total voltage impressed on the resistor and reactor by 60°. Assuming the phase rotation of the three-phase system to be in the order, a, b, c, as indicated in Fig. 9, the outputs of the voltage filters will be proportional to the desired positive phase-sequence voltages.

The relay 50 for controlling the closure of the circuit breaker 25a on a dead network or loop circuit also is employed in Fig. 9.

It should be noted that the phasing system illustrated in Fig. 9 provides complete phasing protection for a network switch with only one relay 56. The only parts required in addition to the relay are two simple voltage filters 59 and 60. The operation of the phasing system illustrated in Fig. 9 will be explained further with reference to Figs. 9a to 9d, which show vector representations of voltage conditions in the voltage filters for various conditions of the feeder circuit. In these figures the reference characters a, b, c designate physical points based on the normal condition in Fig. 9a.

Figure 9A:
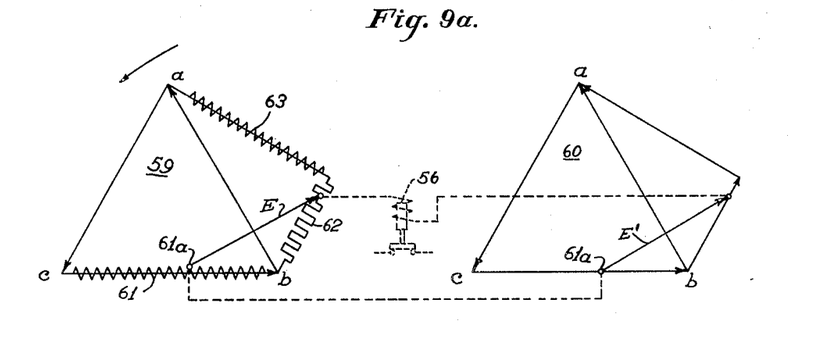
Figs. 9a, 9b, 9c and 9d are diagrammatic views showing vector relationships for the network switch of Fig. 9.

In Fig. 9a, vector relations are shown for the voltage filters when both the feeder circuit 1' and the network or loop circuit are properly connected and energized. Under these conditions, the line voltages applied to the voltage filter 59 may be represented by three vectors ac, cb and ba, the direction of rotation of these vectors being counter-clockwise, as indicated by the arrow. The voltage cb is applied across the auto-transformer 61 of the voltage filter 59 and this is represented in Fig. 9a by superimposing the auto-transformer on its voltage vector. Similarly, the voltage vector ba is applied across the resistor 62 and the reactor 63 connected in series, and the resistor and the reactor are indicated in Fig. 9a as superimposed on their respective vector components. With the conditions as illustrated in Fig. 9a, the output of the voltage filter 59 is a vector E.

The vector conditions for the voltage filter 60 are similar to those illustrated for the voltage filter 59. Consequently, the voltage output of the filter 60 may be represented by a vector E' which is substantially equal in magnitude and direction to the vector E.

The connections for the relay 56 are illustrated in Fig. 9a in dotted lines. It will be noted that the outputs of the voltage filters 59 and 60 are connected in the circuit for the relay 56 in phase opposition. Consequently, substantially no current flows through the relay 56 and the relay remains closed to permit closure of the circuit breaker 25a.

Figure 9B:
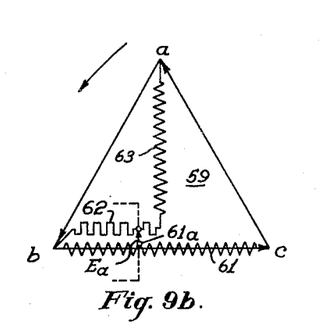

If two of the phase conductors of the feeder circuit 1' are interchanged during repairs, the circuit breaker 25a should not close. The vector relations in the filter 59 for such a condition are illustrated in Fig. 9b, wherein it is assumed that the phase conductors c and b are interchanged.

The effect of such an interchange of the conductors c and b is to reverse the voltage across the auto-transformer 61. This reversal is indicated in Fig. 9b by reversing the representation of the auto-transformer. Moreover, the effect of such an interchange is to rotate the voltage applied across the reactor 63 and the resistor 62 by 120°, measured in the clockwise direction, as illustrated in Fig. 9b. From an inspection of these vector relations it will be noted that the vector Ea, which corresponds to the vector E of Fig. 9a, is reduced substantially to zero. Since the output voltage E' of the voltage filter 60 remains unchanged, it follows that a substantial resultant voltage E' is applied across the relay 56, and the relay consequently picks up to prevent closure of the circuit breaker 25a. In other words, the interchange of the two conductors c and b results in the application of a system of voltages to the voltage filter 59, which rotates in a direction similar to the rotation of a system of negative phase sequence vectors. Since the voltage filter 59 is designed to pass only a quantity dependent upon a positive phase sequence system of vectors, it follows that the voltage output Ea of the voltage filter 59 is substantially zero for the conditions assumed in Fig. 9b.

If in repairing the feeder circut 1', all three phase conductors are advanced 120°, the effect on the voltage filter 59 may be represented by rotating all of the vectors of Fig. 9a by 120°. This is illustrated in Fig. 9c.

Figure 9C:
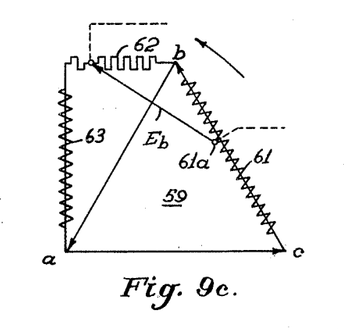

Referring to Fig. 9c, it will be noted that the output voltage of the filter 59 is represented by a vector Eb, which is substantially equal in magnitude to the vector E of Fig. 9a but differs in phase therefrom by 120°. Since the vector E' representing the output of the voltage filter 60 remains unchanged, it follows that the resultant of the voltages E' and Eb is of substantial magnitude and causes the relay 56 to pick up and prevent closure of the circuit breaker 25a.

If in repairing the feeder circuit 1', all three phase conductors are rotated 240°, the conditions in the filter 59 may be represented by rotating the vectors in Fig. 9a by 240°. This has been done in Fig. 9d.

Figure 9D:
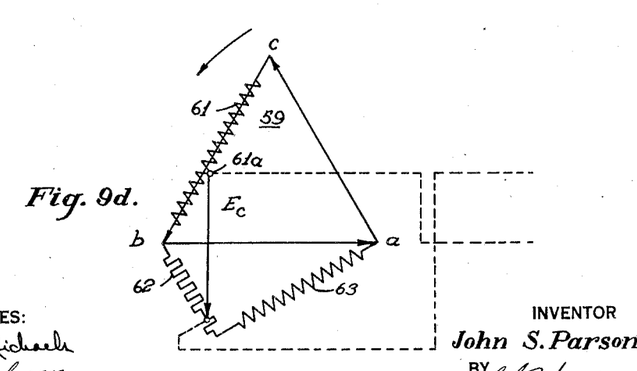

The voltage output of the filter 59 in Fig. 9d is represented by a vector Ec which is substantially equal in magnitude to the vector E of Fig. 9a, but differs in phase therefrom by 240°. Since the vector E' representing the output of the voltage vector 60 remains unchanged, the resultant of the vectors E' and Ec represents a substantial voltage across the relay 56 and the relay picks up to prevent closure of the circuit breaker 25a.

Figure 10:
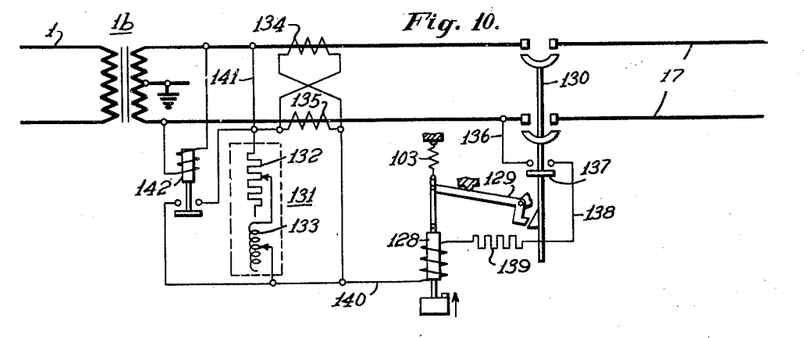
Fig. 10 is a diagrammatic view of a further modification of a network switch.

In the network switches thus far described, a current-responsive control member is employed for preventing the tripping of the circuit breaker when a fault occurs adjacent thereto on the associated loop circuit. By proper compensation of the voltage applied to the solenoid 105 of Fig. 5 or 7, it is possible to control the tripping of the circuit breaker by means of the solenoid alone. Fig. 10 illustrates such a construction wherein a single solenoid 128 is employed for controlling a tripping lever 129 for a circuit breaker 130. The solenoid 128 may be energized from the secondary of the network transformer 1b in accordance with the voltage present on the feeder circuit 1. For this purpose, a compensator 131, illustrated as consisting of an adjustable resistor 132 and an adjustable reactance 133, is energized in accordance with the current flowing in the secondary of the network transformer by means of two current transformers 134 and 135. The impedance of the compensator 131 is so proportioned that the current flowing therethrough produces a voltage drop thereacross which is proportional to the voltage drop across the transformer 1b. The energizing circuit for the solenoid 128 may be traced from one terminal of the transformer secondary through a conductor 136, the front contacts of a pallet switch 137 carried by the circuit breaker, a conductor 138, a resistor 139, the energizing coil of the solenoid 128, a conductor 140, the compensator 131 and a conductor 141 to the other main terminal of the secondary winding. From an inspection of this circuit it will be noted that the voltage across the solenoid 128 is proportional to the secondary voltage of the transformer plus the voltage represented by the drop across the compensator 131. Consequently, the solenoid 128 will be energized in accordance with the voltage present on the feeder circuit 1.

Should a fault occur on a loop circuit adjacent the circuit breaker 130, the voltage across the secondary of the transformer 1b may drop to a negligible value. However, the voltage drop across the compensator 131 rises to a substantial value corresponding to the drop across the transformer 1b, and the solenoid 128 consequently will remain energized by a substantial voltage. With a fault on the loop circuit, the voltage on the feeder circuit 1 rarely falls below approximately 50% of its normal value. Such a value is well above the voltage dropout setting for the solenoid 128, which may be 25 to 30% of normal voltage. When the network transformer and the adjacent sections of the loop circuit 17 are completely deenergized, the voltage across the solenoid 128 falls below 25 to 30% of the normal feeder circuit voltage, and the spring 103 operates to move the tripping lever 129 to its tripping position.

Under the conditions thus far described, the circuit breaker 130 may trip while carrying substantial current. For example, if a fault occurs on the feeder circuit 1 adjacent the network transformer 1b, the voltage across the solenoid 128 may drop to a low value, thereby permitting the circuit breaker 130 to trip. Such tripping would be under conditions wherein the circuit breaker carries substantial current. Here again, such tripping is permissible if the circuit breaker is designed for such operation, but preferably the controls should be such that the circuit breaker does not open while carrying substantial current.

To prevent this undesirable operation of the circuit breaker 130, a relay 142 may be provided for short-circuiting the compensator 131. This relay 142 is energized in accordance with the voltage across the secondary of the network transformer 1b. When the voltage applied to the relay 142 rises above a predetermined value, the relay picks up to close its front contacts, thereby short-circuiting the compensator 131 and energizing the solenoid 128 in accordance with the voltage across the secondary of the transformer 1b. While the voltage across the secondary of the transformer is above the dropout value for the relay 142, the solenoid 128 is energized in accordance with the secondary voltage to maintain the tripping lever 129 in its latching position.

If a fault occurs on a secondary loop circuit adjacent the circuit breaker 130, the voltage across the relay 142 may drop to substantially zero. Consequently, the relay 142 opens its contacts to place the compensator 131 in operation. Because of the operation of the compensator, the voltage across the solenoid 128 becomes proportional to that present in the feeder circuit 1, and the circuit breaker 130 consequently does not open as long as this voltage is present.

Should a fault occur on the feeder circuit 1, the voltage across the secondary of the transformer 1b remains above the dropout setting for the relay 142. The solenoid 128 continues to be energized in accordance with the voltage across the secondary of the transformer 1b, and this is sufficient to prevent tripping of the circuit breaker 130.

Preferably, the dropout voltage for the solenoid 128 should be as low as possible when employed with the relay 142. For example, a dropout at 10 to 15% of normal voltage is preferable to a dropout at 25 to 30% of normal voltage. This may be obtained by making the resistor 139 of a material having a high positive temperature coefficient of resistance. Such a resistance may be obtained by employing tungsten therefor in the form of one or more lamps. The relay 142 may have a dropout setting approximately 5 to 10% above the maximum dropout voltage of the solenoid 128. In order to assure dropout of the relay 142 in advance of operation of the solenoid 128, the solenoid may be provided with a slight time delay in its tripping direction.

From the foregoing discussion it is believed that the operation of a distribution system similar to that disclosed in Fig. 3 is apparent. Assuming that the system is in operation and energized from all three feeders, each of the loop circuits 17, 18 and 19 carry load in a manner analogous to that of the conventional secondary network circuit. If a fault occurs on any of the loop circuits, current is supplied to the fault for a period of two to two and one-half seconds. If the fault fails to burn itself clear within this period the sectionalizing switches adjacent the fault trip. About four to six seconds later these sectionalizing switches reclose and remain closed for another two to two and one-half seconds. If the fault again fails to burn itself clear, the sectionalizing switches again open and continue to "pump" for approximately six to twelve cycles at which time the fuses 62 associated with these sectionalizing switches blow to prevent further closure thereof. The sound portions of a loop circuit then continue to supply load to all but a small portion of a load adjacent the fault.

If a network transformer directly connected to the faulted section of the loop circuit is provided with fuses having a long time delay so that the sectionalizing switches will trip first on any fault, the fuses will blow if the loop fault fails to burn clear within the time provided by the fuse setting.

If a fault occurs on one of the feeder circuits such as the feeder circuit 1, at the expiration of the two to two and one-half seconds minimum, the sectionalizing switches adjacent each of the network transformer switches 1b open to disconnect the feeder circuit 1 from the remainder of the loop circuits. In addition, the feeder circuit breaker 1a, which is provided with a conventional tripping control, opens to deenergize completely the feeder circuit 1, the network transformers 1b and the network switches 10. The network switches 10 in response to this deenergization trip to disconnect the feeder circuit 1 from the loop circuits.

At the expiration of four to six seconds the sectionalizing switches 11 adjacent each of the network transformers 1b reclose to restore the loop circuits to their original condition. The entire loop circuits then continue to supply load from the network transformers associated with the sound feeders 2 and 3, the load being uniformly distributed among these network transformers.

Following its tripping, the feeder circuit breaker 1a promptly recloses. If the fault on the feeder circuit has cleared itself prior to the reclosure, the feeder circuit breaker remains closed. At the expiration of approximately three to six seconds the network switches 10 associated with the network transformers 1b reclose to restore full service to the loop circuits 17, 18 and 19.

If the fault on the feeder circuit 1 fails to clear prior to the first reclosure of the feeder circuit breaker 1a, the feeder circuit breaker again trips prior to reclosure of the network switches associated with the network transformers 1b. After the expiration of ten seconds, the feeder circuit breaker 1a again closes. If the fault has cleared in the meantime, the network switches 10 associated with the network transformer 1b close at the expiration of three to six seconds to restore full service for the loop circuits. Assuming that the fault has not cleared, the feeder circuit breaker 1a again trips out and at the expiration of fifteen seconds the same cycle is repeated.

After three reclosures, if the fault persists, the feeder circuit breaker 1a is permanently locked out and the feeder circuit 1 is permanently disconnected from the bus 4 by the feeder circuit breaker 1a and from the loop circuits by the associated network switches 10. Automatic reclosing feeder circuit breakers of this type are well known in the art.

Although the system illustrated in Fig. 3 does not offer a continuity of service fully equal to that of the system illustrated in Fig. 1, it is a great improvement over the radial system of distribution and is an economical system to install.

If desired, an artificial fault may be established for a feeder circuit by an opening of a feeder circuit breaker in order to ensure operation of all network switches associated with the feeder circuit whenever the feeder circuit breaker opens. This is represented in Fig. 3 by a switch P. A closure of this switch, either manually or by opening of the feeder circuit breaker, establishes an artificial fault across the feeder circuit 1 through a suitable current-limiting impedance Z.

Certain subject-matter herein disclosed is claimed in my copending applications, Serial No. 342,938, filed June 28, 1940, Serial No. 440,960, filed April 29, 1942, and Serial No. 465,323, filed November 12, 1942.

Although I have described the invention with reference to certain specific embodiments thereof, numerous modifications thereof are possible. Therefore, I do not desire the invention to be restricted except as required by the appended claims when interpreted in view of the prior art.

I claim as my invention:

1. In an electrical distribution circuit having two portions to be operatively connected and disconnected, a switch for operatively connecting said two portions, means for tripping said switch only if the current passing therethrough first rises above a predetermined value for a predetermined time and the current through said switch subsequently is below a predetermined value, and voltage-responsive means permitting a tripping operation of said switch only if the voltage of said distribution circuit adjacent said switch is below a predetermined value.

2. In an electrical distribution circuit having two portions to be operatively connected and disconnected, a switch for operatively connecting said two portions, means for tripping said switch, and auxiliary means for preventing operation of said tripping means, said auxiliary means comprising a thermal element responsive to current flowing through said switch for rendering said auxiliary means ineffective.

3. In an electrical distribution circuit having two portions to be operatively connected and disconnected, a switch for operatively connecting said two portions, means for tripping said switch, means responsive to the voltage of said distribution circuit adjacent said switch for preventing operation of said tripping means, and auxiliary means for preventing operation of said tripping means, said auxiliary means comprising a thermal element responsive to current flowing through said switch for rendering said auxiliary means ineffective.

4. In an electrical distribution circuit having two portions to be operatively connected and disconnected, a switch for operatively connecting said two portions, means for tripping said switch, means responsive to the voltage of said distribution circuit adjacent said switch for preventing operation of said tripping means, means responsive to current flowing through said switch for preventing operation of said tripping means, auxiliary means for preventing operation of said tripping means, said auxiliary means comprising a thermal element responsive to current flowing through said switch for rendering said auxiliary means ineffective for a substantial time.

5. In an electrical distribution circuit having two portions to be operatively connected and disconnected, a switch for operatively connecting said two portions, means for tripping said switch, including a tripping latch for holding said switch closed, said latch being biased towards its tripping condition, means responsive to current flowing in said distribution circuit for preventing operation of said tripping latch to its tripping condition, means responsive to voltage in said distribution circuit adjacent said switch for preventing operation of said tripping latch to its tripping condition, auxiliary means for preventing operation of said tripping latch to its tripping condition, and means responsive to current flowing in said distribution circuit above a predetermined value for a predetermined time for rendering said auxiliary means ineffective.

6. In an electrical distribution circuit having portions to be operatively connected and disconnected, a switch for operatively connecting said portions, means effective for tripping said switch only when current and voltage in said distribution circuit adjacent said switch are below predetermined values, means for closing said switch, auxiliary means responsive to incorrect phase conditions across the contacts of said switch for preventing operation of said closing means, and means effective when a predetermined one of said portions is deenergized for rendering said auxiliary means ineffective.

7. In an electrical distribution circuit having portions to be operatively connected and disconnected, a switch for operatively connecting said portions, means effective for tripping said switch only when current and voltage in said distribution circuit adjacent said switch are below predetermined values, means responsive to voltage in a first one of said portions after a predetermined time delay for closing said switch, auxiliary means responsive to incorrect phase conditions across the contacts of said switch for preventing operation of said closing means, and means effective when a second one of said portions is deenergized for rendering said auxiliary means ineffective.

8. In an electrical distribution circuit, a network transformer and a network switch for operatively connecting portions of said distribution circuit, a common enclosure for said network transformer and said network switch, said common enclosure being designed to contain an insulating liquid for said network transformer and said network switch, and means effective for opening said switch only when current passing therethrough is below a predetermined value.

JOHN S. PARSONS.